Fig. 2

Feb. 17, 1942.   F. P. KRUSE   2,273,050
WORM GEAR CUTTING
Filed Oct. 31, 1938   6 Sheets-Sheet 3

INVENTOR
Frederick P. Kruse.
BY
ATTORNEY

Patented Feb. 17, 1942

2,273,050

UNITED STATES PATENT OFFICE 2,273,050

WORM GEAR CUTTING

Frederick P. Kruse, Berkeley, Calif.

Application October 31, 1938, Serial No. 237,977

3 Claims. (Cl. 90—4)

(Granted under the act of March 3, 1883, as amended April 30, 1928; 370 O. G. 757)

This invention relates to methods and apparatus employing simple fly cutters or single toothed hobs for cutting worm gears of all dimensions within the capacity of standard horizontal plain and universal milling machines or similar machine tools, by application of the molding-generating principle.

It has been the practice heretofore to generate worm gears by the use of a gashed hob, which is a cutter of the same size and shape as the worm with which the worm gear is intended for use. This practice is quite expensive and unsatisfactory, due to the expense of manufacturing a hob, the length of time required for its manufacture and the losses due to cracking and distortion incident to the hardening operation which it undergoes.

By means of this invention the use of such a hob is replaced by the use of a simple fly cutter or single toothed hob. Both these types of cutter may be quickly and inexpensively manufactured.

It is an object of this invention to make possible the generation of worm wheels in standard machine tools.

It is a further object of this invention to eliminate the use of multi-toothed cutting hobs and replace them by simple circular and single fly cutters at an average comparative saving of 500 per cent.

It is another object of this invention to make possible the manufacture of small quantities of worm gears without excessive cutter expense.

It is a further object of this invention to complete the adaptibility of standard milling machines by adding worm-wheel generation to the prior arts of cutting spur, helical and bevel gears therein.

It is a still further object of this invention to make possible the generation of worm gears having teeth of a more efficient form than may be generated by the use of a multi-toothed hob.

Other objects will appear from a consideration of the following description and the accompanying drawings, in which.

The molding generating process of forming the teeth of a worm gear involves the use of the worm with which the gear is finally intended to mesh, or of a cutter shaped like the worm, as a cutting or generating tool.

Figures 10, 11, 12, 13, 14, 19:
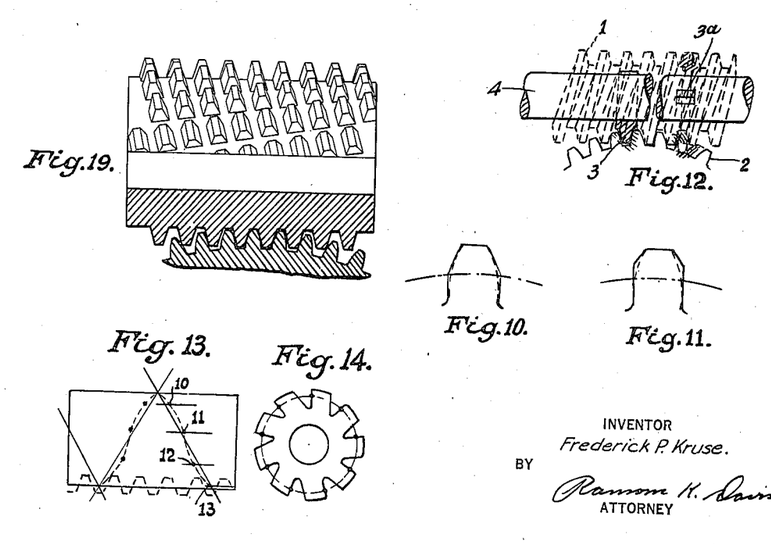
Figs. 10 and 11 are diagrammatic sectional views of worm gear teeth.
Fig. 12 is a composite phantom view of a theoretical worm with fly cutters coinciding with various portions of the worm, and showing a fragment of the periphery of a worm wheel in generating relation thereto.
Fig. 13 is a diagrammatic representation of a conventional multi-tooth hob, showing the pitch line and points lying along the tooth faces which act on one tooth-space of the worm gear blank, through a travel of one axial pitch of the hob.
Fig. 14 is a diagrammatic end elevation of the hob shown in Fig. 13.
Fig. 19 is an elevational view, partly in section, of a conventional hob, shown in cooperating relation with a fragment of a worm gear.

Considering Fig. 12, there is shown a phantom view of a worm 1, meshing with a fragment 2 of a worm wheel. Such a worm, properly located with reference to a plastic blank and rotating with it in the proper ratio, will form accurate teeth in the latter by the molding generating process. Gashing this worm into a multiplicity of teeth makes of it a cutter of the hob type, as shown in Fig. 19. By the use of such a hob in the same manner the same form may be given a blank of steel as was given the plastic blank by the worm. The teeth of such a gashed hob coincide with the outlines of the thread of the worm.

The function of the worm, as it molds the plastic substance, or of the gashed hob, as it cuts its shape in the metal, could be performed by a single cutting tool having the same outline as a section of the worm or a tooth of the gashed hob, if it could be fed helically as the cutter bar and work revolve so that it would follow the path of the thread of the worm from one end to the other as the cutting progresses.

Such a single cutting tool, or fly cutter, is shown at 3 in Fig. 12 in solid lines. It is mounted in cutter-bar 4. The theoretical methods of giving this progressive helical movement to the fly-cutter are various. It would be theoretically possible, for instance, to provide a feed screw for axially advancing the cutter-bar, and to so connect the feed screw with the mechanism for rotating the bar, through differential and change gearing that a rotating movement due to the axial feeding of the bar would be added to or imposed upon its rotation due to its connection with the work. If the proper change gears were selected so that, with the spindle and work driving mechanism stationary, the axial feeding of the cutter-bar would rotate the latter at the proper rate to give the lead of the work, the cutter would evidently follow the thread of the imaginary worm, as shown at 3 and 3a in Fig. 12.

Owing to the action of the differential mechanism, it would still follow the thread of the imaginary worm, even if the latter, with the spindle and work-driving mechanism, were in motion.

Another method could consist in combining in the work, also by differential gearing, a rotation due to the revolving of the cutter with a rotation due to the axial feed of the cutter bar. That this produces the same effect as the foregoing arrangement will be understood from Fig. 12.

Now, if the rotation of the cutter be arrested, but the bar be fed axially toward the right, the positive connections between the feed and the work spindle, through the change gearing and the differential gearing, will cause the work to rotate uniformly with it.

If the feed of the bar is now arrested and the bar is started rotating, the imaginary worm mounted on it will still be kept in proper mesh with the work, owing to the change gear connections between the cutter-bar and the work spindle, acting through the differential gearing. It is thus apparent that the work and worm or a fly-cutter following the thread of the worm will remain in step under any conditions of operation of the cutter or the work. The cutter may be advanced axially only, it may be rotated only, or it may be both advanced and rotated. Still the work and cutter will remain in step and the cutter will behave as though it were a segment of a worm meshing with the worm gear.

With this arrangement, if the change gearing connecting the rotating mechanism of the cutter-bar with the work were disconnected, so that the work would receive no rotation from the rotation of the cutter-bar, and the bar were fed through from left to right, the rotary motion given the work by the connection with the feed of the bar would shape one tooth-space. If, on the other hand, the gearing connecting the feed of the bar with the rotation of the work were disconnected while the connections between the drive of the bar and the work were in operation, the cutter would partially shape each tooth of the work. By combining the two movements in the differential gearing the cutter perfectly performs the work.

In applying the foregoing theory to a standard milling machine it would be necessary to provide an axial feed to the bar with a differential gearing such as to provide a combined rotative and axial timed movement of the cutter with relation to the work. As the main spindles of standard milling machines are always in a fixed lateral position the axial-rotative feeds of the cutter would be limited to some mechanism attached to the cutter-bar with complex change and differential gearing.

Figures 15, 16, 17, 18:
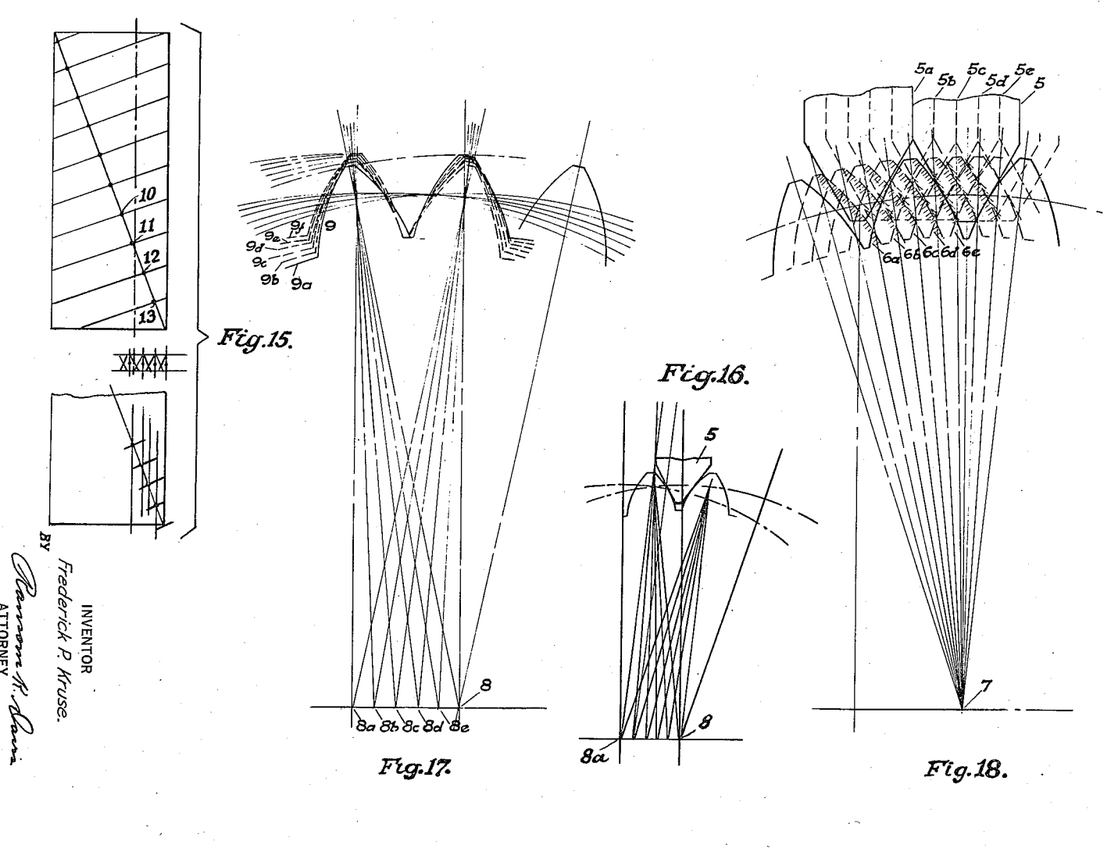
Fig. 15 is a diagrammatic development of the surface of the hob shown in Fig. 13, extending for an axial distance of one axial pitch, showing the cuts taken per tooth space of a gear blank and comparing the cuts taken per tooth-space by a single fly cutter used in accordance with my invention.
Fig. 16 is a diagrammatic showing of the relative positions of gear blank and cutter when following the steps of the procedure comprising one phase of my invention.
Fig. 17 is a diagrammatic representation of the relationship of the teeth of a worm gear to the cutter, when employing one of the methods forming a part of my invention.
Fig. 18 is a diagrammatic representation of the relationship of the teeth of a worm gear to the cutter, when employing another of the methods forming a part of my invention.

The foregoing theory may, however, be applied to standard milling machines in a modified manner with the cutter-bar remaining in a fixed lateral position, and each tooth of the work may be partially formed by maintaining the proper ratio between the rotation of the cutter-bar and the work. If the fly-cutter be advanced into the work by the in-feed method to the proper depth, all of the teeth will be partially formed, and a segment of the imaginary worm thread would properly engage with the gear tooth space if engaged with the space in the same vertical plane as occupied by the fly-cutter in making the cut. However, if an attempt were made to engage the full length of the imaginary worm, interferences would be in evidence in all other vertical planes due to the incomplete generation of the teeth by reason of the restriction of the fly-cutter to work in the one vertical plane, as shown at 5 in Fig. 18. If, now, the fly-cutter 5 of Fig. 18 is moved axially to a distance of a whole number of times the axial pitch of the imaginary worm until the cutter lies at the approximate point where the arc of contact of the finished gear and the mating worm will occur, and the process of generation continued, the timed relation between the cutter and the work will be correct. The cutter is shown after a shift of one axial pitch distance in Fig. 18, occupying the position 5a. The cut taken with the cutter in this position will render more correct the shape of each tooth. If now, the cutter is again moved in the direction of its original position at 5 and for a distance which is a fraction of the initial shift to the position 5b, and the work is at the same time given an angular shift such that the movement on the pitch circle of the work will be equal to the transverse shift, the timed relation between the work and the cutter will still be correct and a still further step in the correct generation of all the teeth will have been accomplished. By continuing these incremental shifts until the cutter has passed through the entire distance wherein contact between the teeth of the gear and the mating worm will occur, the teeth of the gear will be formed to insure correct contact with the teeth of the mating worm throughout the normal range in which said contact can take place. The various positions occupied by the fly-cutter and the corresponding tooth of the gear wheel, after each of several such incremental shifts are indicated in dotted lines on Fig. 18. The righthand face of the fly-cutter successively occupies the position 5a, 5b, 5c, 5d, 5e, etc., while the corresponding tooth face on the gear blank occupies the respective positions 6a, 6b, 6c, 6d, 6e, etc. The center of the gear blank will occupy the position 7.

A second method may be employed to gain the same result. In this method the axial position of the fly-cutter is not changed. An initial cut is taken to the desired depth. Then the work is disengaged from the cutter so that it may be moved transversely without interfering with the cutter. The machine is then stopped, and the work shifted transversely by cross-traverse of the milling-machine table to a distance a whole number of times the axial pitch of the mating worm until the cutter lies at the approximate point where the arc of contact between the gear and the mating worm will occur. Figs. 16 and 17 show at 8 the position of the center of the gear blank when the initial cut is taken, and 8a indicates its position after a transverse shift equal to one axial pitch distance of the mating worm. The work is again advanced vertically into cutting contact with the cutter and a new cut is taken. The work is now disengaged from the cutter and it is moved transversely for a fractional part of the distance through which it was initially moved and in a direction back toward its original position at the same time the work is angularly moved in a direction opposite to its transverse movement so that a point on its pitch circle will move a distance equal to the transverse movement of the center of the blank but in the opposite direction. The center now occupies a position 8b in Figs. 16 and 17 while the tooth 9 of Fig. 17 will have shifted its position from 9a to 9b. A new cut is now taken and the process is continued in the same manner until the center of the blank has shifted through points 8c, 8d and 8e back through its original position and the tooth 9 has occupied successively positions 9c, 9d, 9e and 9f. The incremental shifts are continued until the cutter has passed through the entire distance wherein contact between the gear and the worm will occur. After this series of cuts is completed, a second series may be started, proceeding in the same manner as for the first series but cutting to a greater depth.

As many incremental shifts as may be desired can be used in following either of these methods. The larger the number of shifts used, or the greater the number of cuts taken per linear pitch of the mating gear, the more nearly will the resulting gear teeth approach the perfect form.

If the gear to be cut has an even number of teeth, for example 28, and the mating worm has more than one thread, say 4, then it is obvious that continued rotation of the blank and cutter will produce only a portion of the tooth spaces, in this case only 7. Under such circumstances, in order to obtain a cut in every tooth space it will be necessary after one complete rotation of the gear blank to index it through a distance of one circular pitch and then proceed as before to cut 7 more tooth spaces. This procedure is repeated until all tooth spaces are cut. The method of indexing with a spiral index head is conventional and will not be described.

Figs. 13, 14 and 15 show the number of cuts taken per axial pitch by a quadruple threaded, multi-toothed hob, as compared to the cuts taken per axial pitch by the methods of my invention followed as illustrated by Figs. 16, 17 and 18. Fig. 13 shows a hob with tooth faces at 10, 11, 12 and 13. The upper part of Fig. 15 is a development of the pitch cylinder of the hob of Fig. 16. The parallel lines represent tooth faces. It will be noted that only three cuts per axial pitch are made by the hob, whereas 5 cuts are made, as shown by the lower part of Fig. 21, by the methods of my invention as illustrated in Figs. 16, 17 and 18. It should also be borne in mind that the number of cuts per axial pitch may be increased at will when following these methods.

Figs. 10 and 11 show exaggerated examples of imperfectly formed teeth generated by but one cut to an axial pitch. It will be noted that the profile is composed of a series of flat cuts. This condition will always be in evidence, in varying degrees in all worm-wheel teeth that have been generated by a multi-toothed hob used in the in-feed method. This defect is corrected in the methods of this invention by the use of more cuts per linear pitch.

Figure 1:
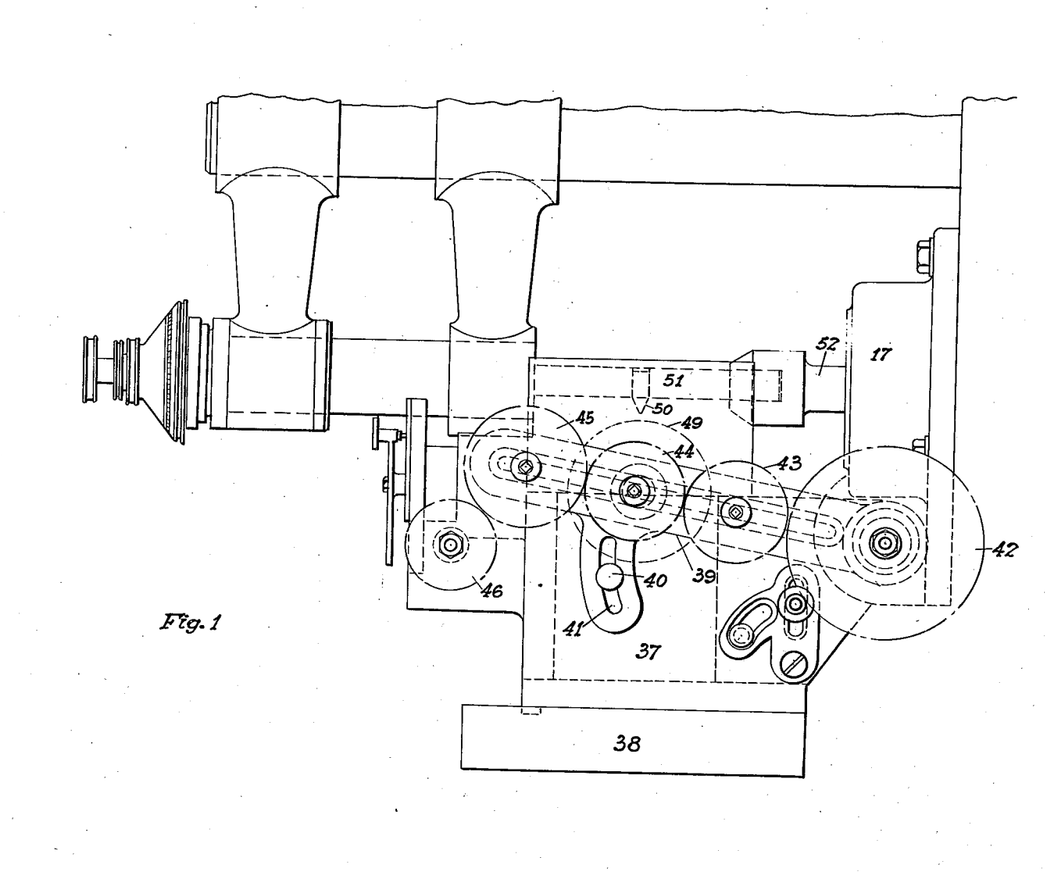
Fig. 1 is an elevational view of a portion of a milling machine embodying the apparatus forming a part of my invention.
Figure 2:
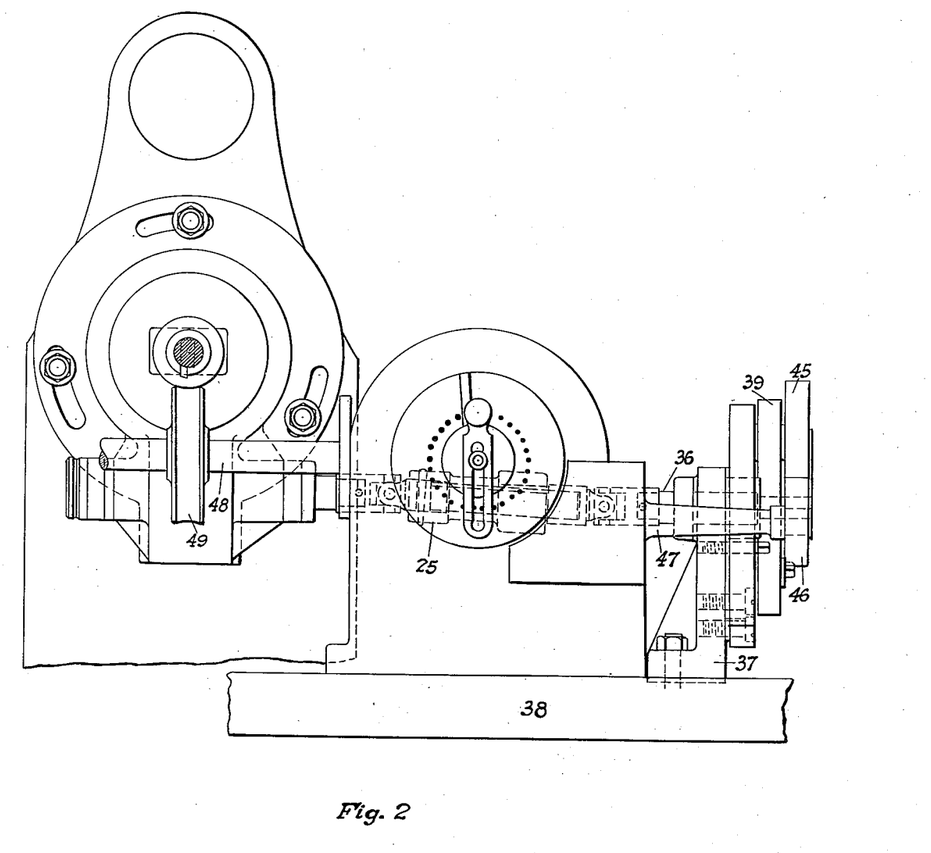
Fig. 2 is an elevational view of the mechanism shown in Fig. 1 except the overarm and micrometer structure taken at right angles to the view of that figure, and looking from the left thereof.
Figure 3:
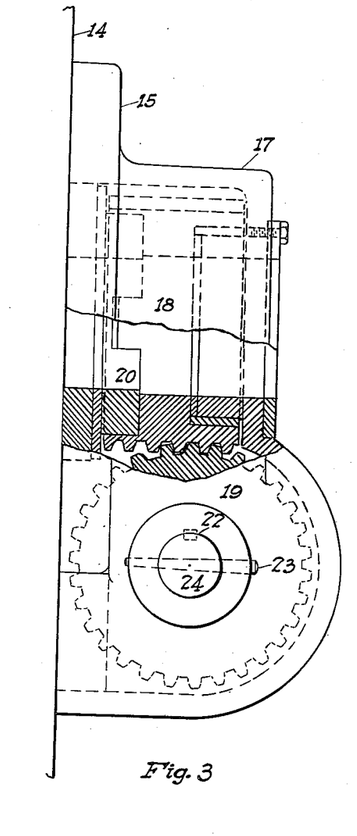
Fig. 3 is an elevational view, partly broken away, of a portion of the mechanism of Fig. 1.
Figure 4:
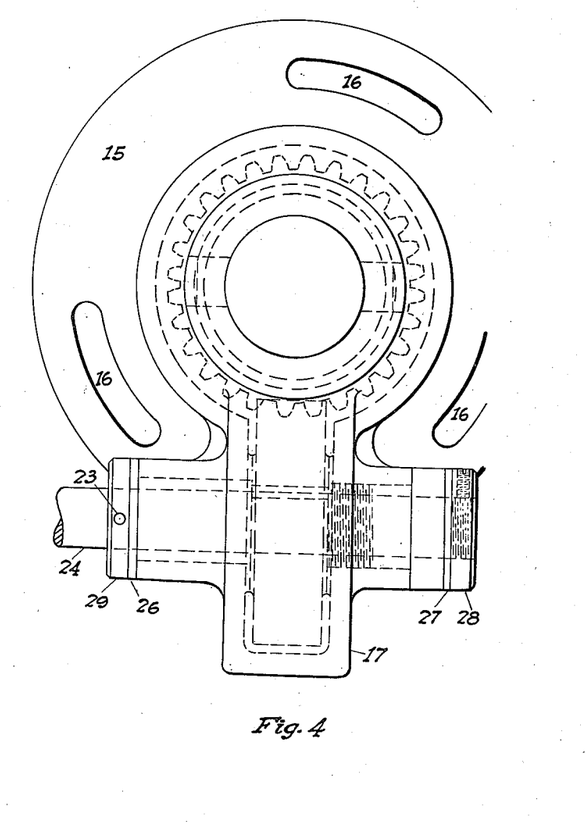
Fig. 4 is an elevational view of the mechanism shown in Fig. 3 taken at right angles thereto and looking from the right thereof.

The apparatus necessary for carrying out these methods consists of several attachments to be added to a standard plain or universal milling machine. Means must be provided for rotating the gear blank at a speed proportional to that of the cutter. This is accomplished by driving the gear blank through a conventional spiral index head by means of a driving head driven by the spindle, the driving head operating through a telescopic drive shaft and a series of change gears, to rotate the worm shaft of the spiral index head. The assembly is shown in Figs. 1 and 2. Figs. 3 and 4 show the details of the spindle drive head.

The head is attached to the face 14 of the milling machine column by means of a flange 15 provided with slots 16 through which bolts from the column may extend. The main portion of the head consists of a housing 17 containing two meshing gears 18 and 19, which may be either of the spiral or miter types, the axes of which extend at right angles to each other. The spindle nose 20 is slotted and a portion 21 of the gear 18 extends into the slot. The drive of the gear takes place by means of the interfitted portion 21. Provision is made for extending the drive of the spindle to the cutter bar. Since this arrangement is conventional it is not shown.

Figure 6:
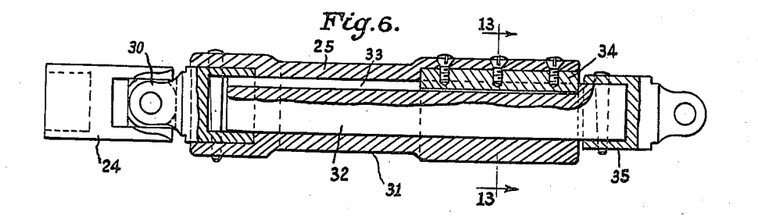
Fig. 6 is an elevational view, partly in section, of the telescopic drive shaft forming a portion of the apparatus which I prefer to use in carrying out my invention.
Figures 7, 8, 9:
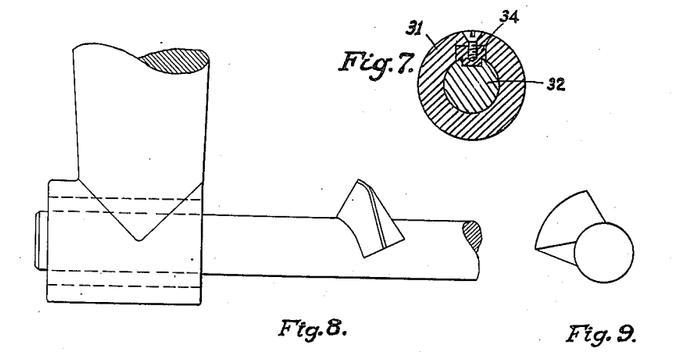
Fig. 7 is a cross-sectional view taken on line 7—7 of Fig. 6.
Fig. 8 is an elevational view of a single-tooth hob and its mounting means.
Fig. 9 is an end elevational view of the hob of Fig. 8.

The gear 19 is keyed at 22 to shaft 24 which forms a portion of the telescopic universal drive shaft 25 shown in Figs. 2, 6 and 7. Thrust on this shaft is taken up by two Babbitt metal thrust washers 26, 27. The washer 27 is adjustable by means of a thrust adjusting nut 28. The shaft 24 is pinned at 23 to a thrust collar 29 which rides against washer 26.

The telescopic universal drive shaft, as shown in Figs. 6 and 7, consists of stub shaft 24, which is connected to a universal joint 30, to the other side of which is attached the sleeve 31. Slidably mounted in the sleeve 31 is a shaft 32, having formed therein a longitudinal keyway 33. A key 34 attached by screws or bolts to the sleeve 31 is slidably disposed in keyway 33. Shaft 32 is attached to a universal joint 35, which in turn is attached to shaft 36, shown in Fig. 2. Shaft 36 is journalled in support 37 which is bolted to table 38. Shaft 36 also forms a pivot about which is journalled gear quadrant 39, the quadrant being secured to support 37 by means of pin 40 acting through slot 41 of the quadrant. The gear quadrant carries four gears, as shown, but the number may be varied and their arrangement may be altered to suit the requirements of the work in hand. On the end of shaft 36 is secured gear 42. An idler gear 43 meshes with it and also with idler gear 44 which meshes with idler gear 45. The latter drives spur gear 46 on stub shaft 47 which actuates the worm in the spiral index head. The gearing in the head drives shaft 48 on which is secured gear blank 49, which constitutes the work. Gears 42, 43, 44 and 45 are carried by the gear quadrant.

Figure 5:
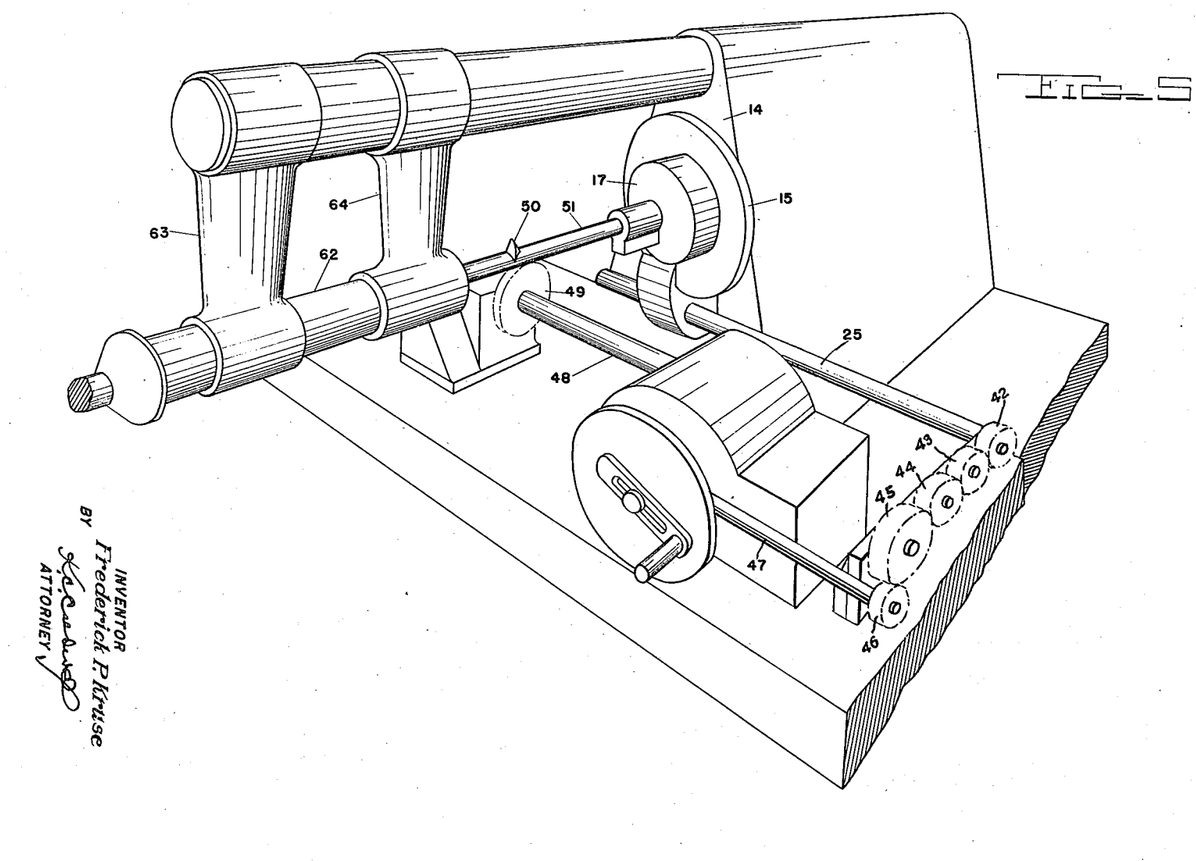
Fig. 5 is an elevational view in perspective of a portion of a milling machine embodying apparatus by which the invention may be carried out.

In order to carry out the first of the methods described above it is necessary to axially shaft the fly-cutter an accurately determined distance. This may be accomplished by the use of a micrometer. A convenient and accurate micrometer axial shifting device which I prefer to use for this purpose is shown generally in Figs. 1 and 5 and is fully shown and described in my divisional application, Serial No. 394,754, filed May 23, 1941. The fly-cutter 50, as shown in Fig. 1, is carried by cutter-bar 51. The cutter bar is supported at one end by a sleeve 52 which in turn is connected to the spindle through the spindle drive head 17 described above. The other end of the cutter bar 51 is held for rotation by a sleeve member 62, the latter being supported in a fixed manner by the milling machine overarm supports 63 and 64.

When the root diameter of the mating worm is unusually small as compared to the lead and pitch, it may be impossible to use an inserted fly-cutter, as shown in Fig. 1. In such cases a single tooth hob such as illustrated in Figs. 8 and 9 may be employed.

The method of selecting change gears to secure a desired relationship between the movements of the gear-blank and cutter will be made clear by the following example:

Assume that the number of teeth to be cut in the gear blank is 29, that the number of threads in the mating worm is 4 and that the spindle and drive-shaft rotate in a 2 to 1 ratio. In the standard spiral index head the worm shaft makes 40 revolutions for one revolution of the work carrying shaft. It will therefore be necessary to rotate the worm shaft 47 of the index head 160 times for each four revolutions of the work. As the cutter-bar rotates 29 times it will be necessary for the gear blank to rotate 4 times, or at a ratio of 7¼ to 1. The cutter-bar will rotate 29 times while the drive shaft rotates 58 times. The change gearing on the gear quadrant will then be factors of $$\frac{160}{58} = \frac{2 \times 80}{2 \times 29} = \frac{20 \times 80}{20 \times 29}$$

The 80 tooth gear will be the driver and the 29 tooth gear the driven. Referring to Fig. 1, gear 42 will have 80 teeth and gear 46 will have 29.

The invention described herein may be manufactured and/or used by or for the Government of the United States of America for governmental purposes without the payment of any royalties thereon or therefor.

Having thus described my invention, what I desire to claim as new is:

1. The method of generating worm gears having teeth of an involute form by means of a single tooth cutter, which comprises rotating the gear blank and the cutter in synchronism at such speeds that the path of the cutter with respect to the gear blank coincides with the thread of the worm with which the gear is intended to mate until an initial cut has been made for every tooth space of the gear, axially shifting the cutter-bar a distance equal to a whole number of times the axial pitch of the mating worm, until the cutter lies at the approximate point where contact between the mating worm and the finished gear will occur, taking a second cut in every tooth space of the gear, axially shifting the cutter-bar in a direction opposite to that of the initial shift and an amount equal to a fractional part of the axial pitch of the worm and rotating the gear blank such that a point on its pitch circle adjacent the cutter moves through the same distance and in the same direction, taking another cut in every tooth space of the gear and repeating the last mentioned combined axial shift of the cutter and angular shift of the gear blank, followed by a cut in every tooth space, until the cutter has been moved through entire distance wherein contact between the gear and the worm will occur.

2. The method of generating worm gears having teeth of an involute form by means of a single tooth cutter, which comprises rotating the gear blank and the cutter in synchronism at such speeds that the path of the cutter with respect to the gear blank coincides with the thread of the worm with which the gear is intended to mate until an initial cut has been made for every tooth space of the gear, shifting the gear blank along a line parallel to the axis about which the cutter rotates, a distance equal to a whole number of times the axial pitch of the mating worm and until the cutter lies at the approximate point where the arc of contact of the finished gear and the mating worm will occur, making a second cut in every tooth space of the gear blank, shifting the gear blank along the same line as before but in the opposite direction for a distance equal to a fraction of one axial pitch of the mating worm, rotating the gear blank such that a point on its pitch circle adjacent the cutter moves through the same distance but in the opposite direction to that of the shift, making another cut in each tooth space of the gear blank, and repeating the last mentioned combined angular and axial shifts followed by a cut in every tooth space, until the gear has moved linearly through the entire distance wherein contact between the gear and the worm will occur.

3. The method of generating a worm gear having teeth of an involute form by means of a single tooth cutter, which comprises, rotating the gear blank and the cutter in synchronism at such speeds that the cutter will always contact the gear blank in the same manner as though it were a portion of a continuous mating worm, until an initial cut has been made for every tooth space of the gear, with the path of the cutter lying in a vertical plane including the center of the gear blank, changing the relative location of the cutter and the gear blank by movement normal to said vertical plane for a distance of a whole number of times the axial pitch of the mating worm and until the cutter lies at the approximate point where the arc of contact of the finished gear and the mating worm will occur, taking another cut in every tooth space of the gear blank, again changing the relative location of the cutter and the gear blank by movement normal to and toward said vertical plane for a distance equal to a fraction of the axial pitch of the mating worm, rotating the gear blank so that a point on its pitch circle adjacent the cutter will move toward said vertical plane a distance equal to that of the last mentioned relative movement, taking another cut in every gear space of the gear blank, and repeating said combined relative movements of gear blank and cutter and angular gear blank movements following each combined movement with a cut in each tooth space of the gear, until the cutter has passed through the entire distance wherein contact of the gear and the mating worm will occur.

FREDERICK P. KRUSE.